(12) United States Patent
Kini

(10) Patent No.: US 9,307,025 B1
(45) Date of Patent: Apr. 5, 2016

(54) OPTIMIZED FILE CREATION IN WAN-OPTIMIZED STORAGE

(75) Inventor: Adityashankar Kini, San Carlos, CA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 1316 days.

(21) Appl. No.: 13/074,602

(22) Filed: Mar. 29, 2011

(51) Int. Cl.
*G06F 15/16* (2006.01)
*H04L 29/08* (2006.01)
*G06F 17/30* (2006.01)

(52) U.S. Cl.
CPC ...... *H04L 67/1097* (2013.01); *G06F 17/30067* (2013.01); *H04L 67/1068* (2013.01)

(58) Field of Classification Search
CPC ..... H04L 12/00; H04L 67/32; H04L 67/1097; G06F 17/30067
USPC .......................................................... 709/218
See application file for complete search history.

(56) References Cited

U.S. PATENT DOCUMENTS

| | | | |
|---|---|---|---|
| 2006/0129627 A1* | 6/2006 | Phillips et al. | 709/200 |
| 2008/0120727 A1* | 5/2008 | Lee et al. | 726/30 |
| 2008/0215639 A1* | 9/2008 | Rifkin et al. | 707/203 |
| 2008/0320151 A1* | 12/2008 | McCanne et al. | 709/228 |
| 2009/0037393 A1* | 2/2009 | Fredricksen et al. | 707/3 |
| 2009/0092137 A1* | 4/2009 | Haigh et al. | 370/392 |
| 2009/0228531 A1* | 9/2009 | Baumann et al. | 707/204 |
| 2010/0082700 A1* | 4/2010 | Parab | 707/803 |
| 2011/0246430 A1* | 10/2011 | Prahlad et al. | 707/679 |
| 2011/0276963 A1* | 11/2011 | Wu et al. | 718/1 |

* cited by examiner

*Primary Examiner* — June Sison
(74) *Attorney, Agent, or Firm* — Park, Vaughan, Fleming & Dowler LLP; Laxman Sahasrabuddhe

(57) ABSTRACT

The file creation on remote data storage accessible via a WAN can be optimized by creating temporary files in advance on a remote data storage. The file handles or other file access parameters for these temporary files are cached at a client network location. A file creation request from a client is intercepted at the client network location and one of the cached file handle is returned to the client. This enables the client to immediately write data to the corresponding temporary file, avoiding the delay incurred by communicating the file creation request and its response over a WAN. One or more storage commands are sent to the remote data storage to change the attributes of the temporary file to match those requested by the client, such as the file name, directory, and/or file permissions. File creation requests may be selectively optimized according to rules or criteria specified by users.

27 Claims, 3 Drawing Sheets

OPTIMIZED FILE CREATION IN WAN-OPTIMIZED STORAGE

BACKGROUND

The present invention relates to the field of network storage devices in general and in particular to accelerating and optimizing the creation of files on remote network storage devices.

Many organizations include users at two or more locations, such as branch offices. To facilitate cooperation by their users, improve efficiency, and reduce organizational costs, organizations may connect two or more local-area networks (LANs) at different locations with each other via a wide-area network (WAN), such as the internet or a private WAN. This enables users at different locations to share data and applications. This also allows resources such as applications servers and data storage at a single or small number of locations to serve users at many other network locations.

However, WAN performance bottlenecks create problems when connecting network locations via WANs. WANs typically have lower bandwidth and higher network latency than LANs. WAN bandwidth limits the performance of data intensive operations over a WAN and WAN latency limits the rate that consecutive dependent operations over a WAN can be processed. Both of these factors can dramatically reduce users' application performance when operating over a WAN.

WAN optimization devices optimize network traffic to improve WAN performance in reading and/or writing data over a network. A WAN optimization device typically monitors users' network traffic to attempt to predict data likely to be requested by users. This predicted data is prefetched over the WAN and cached by the WAN optimization devices at the users' respective network locations, so that this data can be quickly accessed by users if requested. WAN optimization devices also typically compress data for communication over the WAN. The WAN optimization devices' prefetching, caching, and compression masks the bandwidth and latency limitations of WANs from users.

WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers. Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. Herein, the term "WAN optimization device" is used to refer to such devices and applications and "WAN optimization" is used to refer to such techniques.

File creation is one area where current WAN optimization devices do not improve performance over a WAN. For typical file systems, a storage client creates a new file by sending a request to the file server or other data storage device. The file server returns a file handle or other file access parameters to the storage client. The storage client can then send write requests including the file handle and the write data. The latency of the WAN typically limits the rate at which new files can be created by storage clients. Moreover, a storage client must wait for the file server to return a file handle for a new file before issuing any write commands to this file; otherwise, the write data may be lost. Thus, each file creation operation typically stalls an application's data output for a time period approximately equal to the round-trip latency of the WAN. For users and applications that rapidly create a large number of files, such a program compilers and linkers; and computer graphics, video, music, and other content creation systems, the performance degradation due to WAN latency in file creation can be substantial.

BRIEF DESCRIPTION OF THE DRAWINGS

The invention will be described with reference to the drawings, in which.

SUMMARY

An embodiment of the invention optimizes the creation of files on remote data storage accessed via a wide-area network. In an embodiment, a set of temporary files are created on the remote data storage and their file handles or other file access parameters are transferred to a client network location for caching. When a client system at the client network location sends a file creation request, an embodiment of the invention intercepts this request at the client network location. One of the previously cached file handles is selected and returned to the client system in a file creation response message. This enables the client system to immediately begin writing data to the corresponding temporary file, avoiding the delay incurred by communicating the file creation request and its response over a wide-area network.

Upon providing a cached file handle or other file access parameters to a client system, an embodiment of the invention also sends one or more storage commands to the remote data storage to change the attributes of the temporary file to match those requested by the client system in its file creation request. These storage commands may change attributes including the file name, file location or directory, and/or file permissions. In a further embodiment, these storage commands may be processed in parallel and asynchronously with any data write request to the temporary file by the client system.

In a further embodiment, file creation requests are selectively optimized according to rules or criteria specified by users. File creation requests may be optimized or passed on to the remote data storage for normal processing depending upon the file type, all or a portion of the file name or file path, the application generating the file creation request, and/or the client system generating the file creation request.

DETAILED DESCRIPTION

Figure 1:
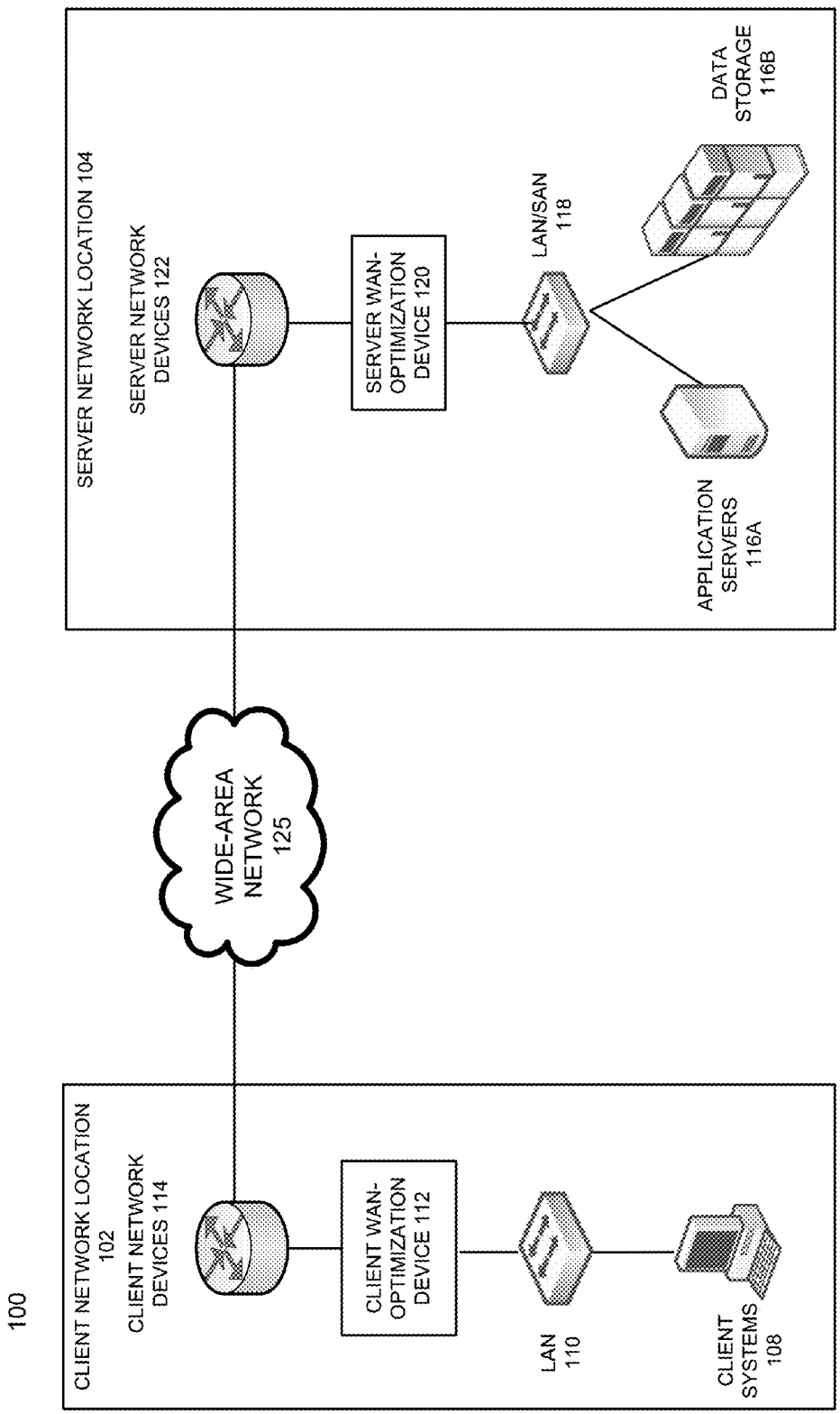
FIG. 1 illustrates an example system including WAN optimization devices suitable for use with embodiments of the invention.

FIG. 1 illustrates an example system 100 including WAN optimization devices suitable for use with embodiments of the invention. System 100 includes a client network location 102 and a server network location 104 connected via a wide-area network (WAN) 125, such as the Internet, an enterprise's internal WAN, or a service provider's fully controlled network. Client network location 102 includes one or more client computer systems 108, which can include desktop computers, laptop computers, rack-mounted or blade computers, and mobile computing devices such as smartphones, tablet computers, and any other type of electronic device capable of communicating via an electronic communications network. Client computers 108 are connected via a LAN network 110, which can include wired network interfaces, such as Ethernet, and wireless network interfaces, such as any of the 802.11 family of wireless network interfaces. System 100 and client network location 102, server LAN 118, and WAN 125 can use a variety of communications protocols, including Media Access Control protocols, such as Ethernet, Internet layer protocols such as IP, transport layer protocols such as TCP and UDP, as well as standard or proprietary application layer protocols such as HTTP, POP and SMTP, and DNS.

LAN network 110 can also include other network devices, such as hubs, switches, routers and other network traffic directing devices; storage-area network front-ends and interfaces; proxies, network-address translation (NAT) and firewall devices; wireless network devices such as access points, bridges, and repeaters; print-servers, and other network service provider devices; one-way or two-way streaming video, audio, video-conferencing, VOIP, and music servers; network logging and network management devices; and network monitoring and traffic inspection devices. These various devices at the client network location 102 are referred to generally as client network devices 114.

Client network location also includes a client-side WAN optimization device 112. As described below, client-side WAN optimization device 112 optimizes network traffic to improve WAN performance in reading and/or writing data over a network. In an embodiment of the invention client-side WAN optimization device 112 optimizes the creation of files by client systems 108 on remote data storage accessible via the WAN 125.

Server network location 104 includes one or more server computer systems 116, which can include one or more application servers 116a and one or more data storage systems 116b, as well as optional desktop computers, laptop computers, server computers, and mobile computing devices such as smartphones, tablet computers, and any other type of electronic device capable of communicating via an electronic communications network. Server computers 116 are connected via a LAN network 118, which can include wired network interfaces, such as Ethernet, and wireless network interfaces, such as any of the 802.11 family of wireless network interfaces. Server network location may also include a storage area network (SAN) 118 for accessing block data storage devices, such as storage arrays, using block storage protocols such as iSCSI or FCP.

Server network location 104 can also include other network devices, such as hubs, switches, routers and other network traffic directing devices; storage-area network front-ends and interfaces; proxies, network-address translation (NAT) and firewall devices; wireless network devices such as access points, bridges, and repeaters; print-servers, and other network service provider devices; one-way or two-way streaming video, audio, video-conferencing, VOIP, and music servers; network logging and network management devices; and network monitoring and traffic inspection devices. These various devices at the server network location 104 are referred to generally as server network devices 122.

Server network location 104 also includes a server-side WAN optimization device 120. As described below, server-side WAN optimization device 110 operates in conjunction with one or more client-side WAN optimization devices, such as client-side WAN optimization device 112, to optimize network traffic to improve WAN performance in reading and/ or writing data over a network. In alternate embodiments, server-side WAN optimization device 120 may be omitted.

Client-side WAN optimization device 112 may operate in a transparent manner to client systems 108 and/or other client network devices 114 while performing optimization of network traffic. For example, client-side WAN optimization device 112 may transparently monitor network traffic from client systems 108 to predict data likely to be requested by the client systems 108. This predicted data is prefetched and cached by the client-side WAN optimization device 112 over the WAN 125 from the server network location 104, so that this data can be quickly accessed by client devices 108 if requested. The client-side and server-side WAN optimization devices 112 and 120 also typically compress data for communication over the WAN 125. The WAN optimization devices' prefetching, caching, and compression masks the bandwidth and latency limitations of WANs from users.

It should be noted that client computers 108 and other network devices in client network location 102 may take on the roles of both clients or servers in network communications. Thus, client computers 108 and other network devices in client network location 102 may initiate network communications (acting as clients) and/or receive network communications initiated by other network devices (acting as servers). Similarly, server computers 116 and other network devices in server network location 104 may take on the roles of both clients or servers in network communications, initiating network communications (acting as clients) and/or receiving network communications initiated by other network devices (acting as servers).

Figure 2:
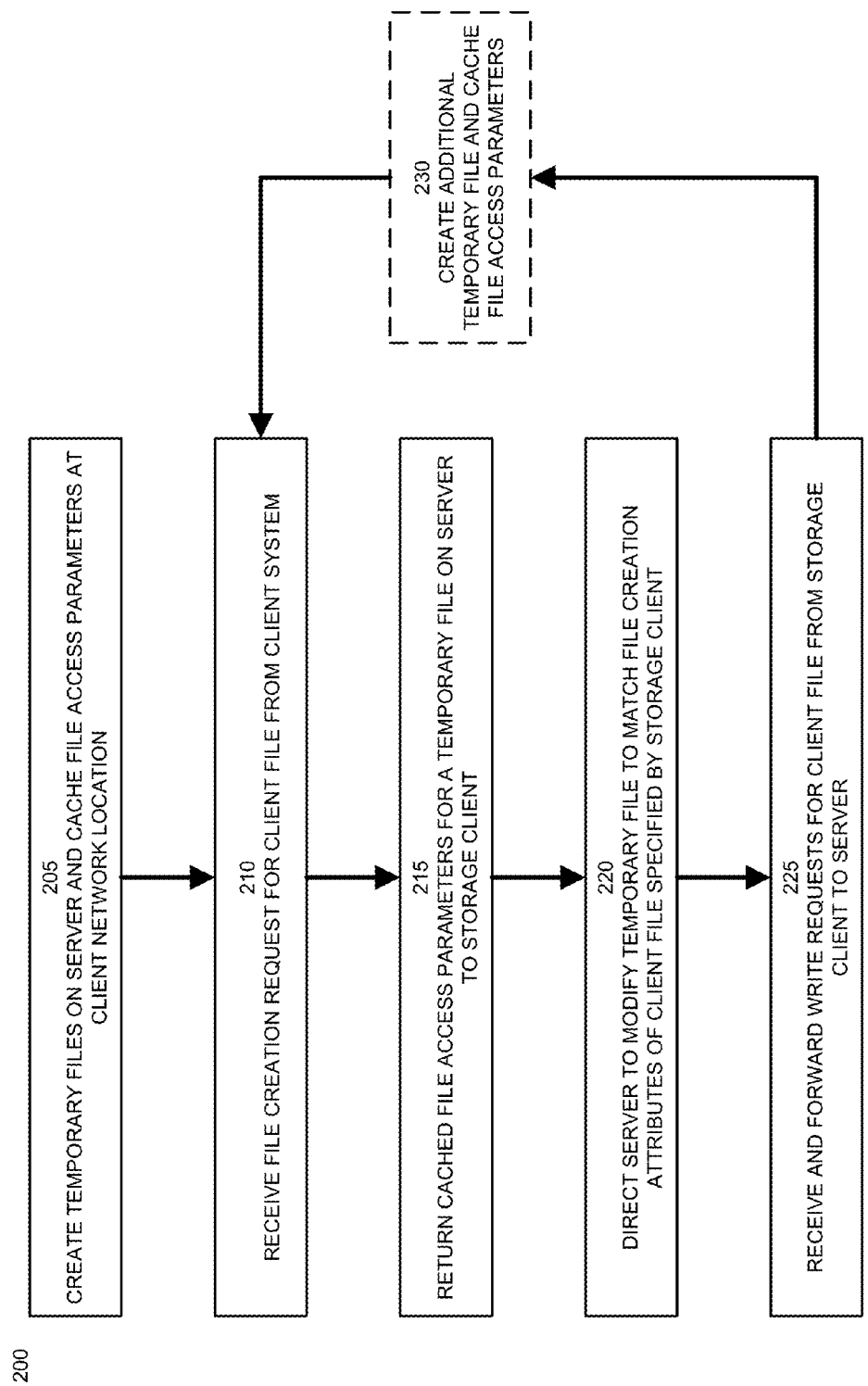
FIG. 2 illustrates a method of optimizing file creation over a WAN according to an embodiment of the invention.

FIG. 2 illustrates a method 200 of optimizing file creation over a WAN according to an embodiment of the invention. In step 205, a set of temporary files are created on a data storage or file server at a remote network location connected via a WAN. For example, a set of temporary files may be created on data storage 116B at server network location 104 for the benefit of client systems 108 at client network location 102. Once the set of temporary files is successfully created, the file handles or other file access parameters needed to access these temporary files are returned by the file server or data storage and transferred to a client-side WAN optimization device at the client network location. The client-side WAN optimization device caches or stores these file handles or other file access parameters.

An embodiment of step 205 creates a relatively large number of temporary files. The number of temporary files in a set may be configured by an administrator or other user and may be based on the typical operating patterns of applications, such as the number of files created by an application in a relatively short period of time, and system factors, such as the storage system and WAN performance. For example, step 205 may create a set of 100 temporary files.

In an embodiment of step 205, the set of temporary files is reserved for the use of a single network location. If there are two or more network locations that include client systems, than each client network location may be assigned its own separate set of temporary files. In this example, the client-side WAN optimization devices at each of the client network locations caches the file handles or other file access parameters of its assigned temporary files. In another embodiment, each client-side WAN optimization device may be assigned its own set of temporary files. For example, if there are two client-side WAN optimization devices at a single client network location, then an embodiment of step 205 creates separate sets of temporary files for each client-side WAN optimization device. In this example, each of the client-side WAN optimization devices at the client network location caches the file handles or other file access parameters of its assigned temporary files. In yet another embodiment, step 205 creates separate sets of temporary files for each client system.

In an embodiment, step 205 creates one or more sets of temporary files that are not accessible to entities other than their respective assigned entities, which are the respective WAN optimization devices caching each sets associated file handles or other access parameters, and optionally the server-side WAN optimization device. This may be done by setting restrictive file permissions for the temporary files and/or creating each set of temporary files in a directory that is inaccessible, hidden, and/or not used by client systems or other unassigned entities.

Step 210 receives a request from a client system to create a file on the remote file server or data storage. In an embodiment, a client-side WAN optimization device transparently intercepts and monitors network traffic from one or more client systems on the same LAN. If intercepted network traffic from a client system includes a file creation request, an embodiment of step 210 identifies the file creation request and the client system's requested file creation attributes associated with the file creation request. Examples of file creation attributes included in the file creation request from the client system include a file name, file path, file type, and/or file access permissions. In an embodiment, the client-side WAN optimization may pass other types of network traffic from client systems on towards its destination or perform other WAN optimization operations on the network traffic.

In response to receiving a file creation request from a client system, an embodiment of step 215 selects one of its cached file handles or other file access parameters associated with one of its assigned temporary files. Step 215 then sends a file creation response message including the selected file handle or other file access parameters to the client system. The file creation response message indicates to the client system that its requested file has been successfully created on the file server or other type of remote data storage and the file handle or other file access parameters enables the client system to immediately begin writing data to the file. In an embodiment, step 215 removes the selected file handle from its set of cached file handles at the client network location, so that this file handle and associated temporary file cannot be selected again for future file creation requests.

In an embodiment, step 215 returns the file handle for the selected one of temporary files to the client system immediately without accessing the file server or other type of remote data storage over the WAN. In an embodiment, step 215 is performed by a client-side WAN optimization device at the same network location as the client system. This eliminates the latency associated with file creation operations over a WAN and prevents applications on the client system from stalling while waiting for a file creation request and file creation response messages to travel to and from the server network location over the WAN.

Because the file creation response message returned to the client system includes a file handle or other file access parameters, the client system can begin writing data to this file. However, because the file handle provided to the client system by step 215 is associated with one of the set of temporary files, the data will not be stored under the file name or file path requested by the storage client. To correct for this, step 220 directs the file server or other type of remote data storage to modify the temporary file associated with the previously selected file handle to match the file creation attributes provided by the client system in its file creation request.

In an embodiment, step 220 may issue one or more storage commands to the remote data storage and/or file server to modify the selected temporary file. For example, step 220 may issue a file rename storage command to change the file name of the temporary file to the file name requested by the client system. Step 220 may also issue a file move storage command to move the temporary file to the file path or storage location requested by the client system. Step 220 may issue a file permission storage command to set the file ownership and/or access permission values to those requested by the client system. Step 220 may issue a storage command to change the file creation date of the temporary file to the current time so that it appears this file was created in response to the client system's file creation request.

In an embodiment, step 220 may be performed before or after and optionally in parallel and/or asynchronously with step 215 and the subsequent steps of method 200. Thus, the modification of the selected temporary file to match the file creation attributes provided by the client system may not need to stall or block the client system from performing other storage operations such as writing data to this file. In an embodiment, once the temporary file has been modified by step 220, the client system assumes full control of this file and is responsible for closing the file and releasing the file handle when it completes its storage operations.

Step 225 receives and forwards any further write requests from the client system to the temporary file, which appears to the client system as a file having the file name, file path, and other attributes that it requested. In an embodiment, step 225 immediately forwards any write requests or other storage commands from this client system and directed to this file to the file server or other type of remote data storage via the WAN. In another embodiment, step 225 may temporarily buffer write requests or other storage commands from the client system to optimize WAN traffic, perform data compression or other WAN optimization techniques, or optionally wait until some or all of the storage operations initiated by step 220 to modify the temporary file are completed.

Following step 225, method 200 returns to step 210 to await the receipt of further file creation requests from one or more client systems. In an embodiment, optional step 230 creates one or more new temporary files on the file server or other type of remote data storage and adds their file handles or other file access parameters to the set of previously cached file handles. This step ensures that the client-side WAN optimization device always has a large set of cached file handles and associated temporary file available to handle successive file creation requests from client systems.

Embodiments of method 200 may be implemented by two WAN optimization devices at two network locations separated via a WAN, such as WAN optimization devices 112 and 120, by a single WAN optimization device operating at a network location including the one or more clients to be optimized, or without any WAN optimization devices. In the latter case, a client system may execute an application that acts as a client-side WAN optimization device and performs method 200 to optimize file creation for this client system. Additionally, embodiments of method 200 may be implemented for any type of file server or other type of remote data storage wherein file access is provided through file handles or other file access parameters. This includes file servers using the NFS file system.

In some implementations, the optimized file creation system described above may make data vulnerable to loss. For example, if one or more of the WAN optimization devices or other systems performing method 200 crash or fail following step 215 but before the completion of the storage operations specified by step 220, the temporary file that the client system writes data to may not ever be modified to match the file name and/or file path expected by the client system. As a result, the client system will not be able to find this file in the future and the data written is essentially lost. One embodiment to prevent this vulnerability is to use journaling, log files, or atomic transaction techniques in step 220 to modify the temporary file to match the file creation attributes specified by the client system.

In another embodiment, method 200 may be selectively applied to file creation requests for specific types of files and/or from specific client systems. This may be used to limit optimized file creation to client systems, applications, and/or data that are tolerant of potential losses. For example, software creation applications, such as program compilers and linkers, typically convert a large number of source code files into corresponding binary object files. These binary object files are then combined into one or a small number of application files. If a binary object file is lost, it can be easily (and often automatically) recreated from the corresponding source code file. Thus, the method 200 can be safely applied to optimize the creation of binary object files, because the loss of one of these files is not critical.

In an embodiment, a user, administrator, or application configures a client-side WAN optimization device or other entity to specify the file types, applications, and/or client systems for which file creation is to be optimized. In a further embodiment, rules or criteria may be provided to specify the file types, applications, and/or client systems for which file creation is to be optimized. For example, a client-side WAN optimization device may identify file creation requests that should be optimized by matching file creation attributes, such as all or a portion of the file name, file path, or file extension provided in the file creation request, with one or more rules or criteria. Rules and criteria may be specified as search patterns, regular expressions, or other pattern matching languages. File creation requests that do not match the rules or criteria are forwarded to the file server or remote data storage for normal, non-optimized processing, while file creation requests that match the rules or criteria are prevented from travelling to the file server or other remote data storage and are processed as described in method 200.

A file server or other type of remote data storage may have a limit on the maximum number of open files. If this limit is reached, the file server or other type of remote data storage may be unable to create any more new files until some open files are closed. To prevent the temporary files held open by one or more client-side WAN optimization devices from blocking the creation of other new files, a further embodiment of the invention monitors the file server or other type of remote data storage to determine the current number of open files. If the limit on open files is in danger of being reached, some or all of the unused temporary files for one or more client-side WAN optimization devices are closed and deleted. When the number of open files falls below a threshold, additional temporary files may be created and assigned to the client-side WAN optimization devices. Embodiments of the invention may use client-side WAN optimization devices and/or a server-side WAN optimization device to monitor the file server or other type of remote data storage.

Figure 3:
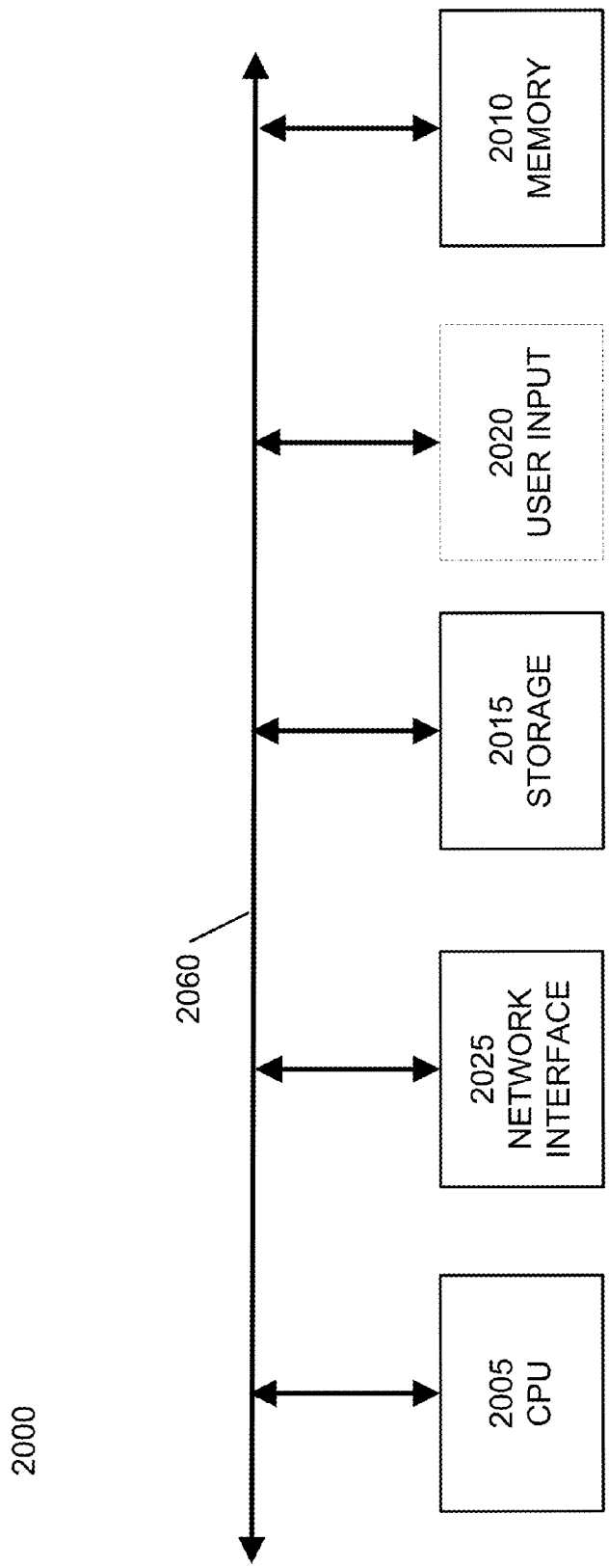
FIG. 3 illustrates an example computer system capable of implementing a transparent network device according to an embodiment of the invention.

FIG. 3 illustrates an example computer system capable of implementing a transparent network device according to an embodiment of the invention. FIG. 3 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art after reading the attached documents. For example, embodiments of the invention can be used with any number of network connections and may be added to any type of network device, client or server computer, or other computing device in addition to the computer illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of optimizing creation of files on a remote data storage, the method comprising:
    prior to receiving a request for creating a new file at a second network location from a first client,
        creating a new file set of at least a new temporary file on a remote data storage at a first network location,
        transferring file access parameters for the new file set via a network to the second network location, wherein the file access parameters include a file handle, and
        caching the file access parameters at the second network location;
    receiving the request for creating the new file at the second network location from the first client, wherein the request for creating the new file includes new file creation attributes;
    in response to receiving the request for creating the new file, providing at least the file handle from the cached file access parameters to the first client, thereby providing the first client with access to the new temporary file in the new file set; and
    issuing at least one storage command from the second network location directing the remote data storage at the first network location to modify the new temporary file to match at least a portion of the new file creation attributes, wherein the storage command is adapted to direct the remote data storage to rename the new temporary file to a file name specified in the new file creation attributes.

2. The method of claim 1, wherein the network includes a wide-area network connecting a first local-area network at the first network location and a second local-area network at the second network location.

3. The method of claim 1, wherein the storage command is adapted to direct the remote data storage to move the new temporary file to a file directory specified in the new file creation attributes.

4. The method of claim 1, wherein receiving the new file creation request comprises:
    intercepting the new file creation request at the second network location, wherein the new file creation request is directed from the first client to the remote data storage.

5. The method of claim 4, wherein intercepting the new file creation request comprises:
    determining if the new file creation request matches a file rule;
    in response to the determination that the new file creation request does not match the file rule, forwarding the new file creation request to the remote data storage at the first network location; and
    in response to the new file creation request matching the file rule, preventing the new file creation request from reaching the remote data storage at the first network location.

6. The method of claim 5, wherein the file rule is configured by a user.

7. The method of claim 5, wherein the file rule is adapted to select a file based on at least a portion of a file name.

8. The method of claim 5, wherein the file rule is adapted to select a file based on at least a file type.

9. The method of claim 5, wherein the file rule is adapted to select a file based on at least a file location.

10. The method of claim 5, wherein the file rule is adapted to select a file based on at least an application associated with the new file creation request.

11. The method of claim 5, wherein the file rule is adapted to select a file based on at least the first client associated with the new file creation request.

12. The method of claim 1, wherein caching is performed by a WAN optimization device at the second network location.

13. The method of claim 1, wherein caching is performed by an application executed by the first client.

14. The method of claim 1, wherein the new file set is associated with a WAN optimization device at the second network location, such that the file access parameters are not cached by any other entity.

15. The method of claim 1, wherein the new file set is associated with the second network location, such that the file access parameters are not cached at any other network location.

16. A method of optimizing creation of files on a remote data storage, the method comprising:
    prior to receiving a request for creating a new file at a first network location from a first client,
        receiving file access parameters at a first network location, wherein the file access parameters correspond with a new file set including at least a new temporary file on a remote data storage at a second network location, wherein the file access parameters include a file handle, and
        caching the file access parameters;
    receiving the request for creating the new file at the first network location from the first client, wherein the request for creating the new file includes new file creation attributes;
    in response to receiving the request for creating the new file, providing at least the file handle from the cached file access parameters to the first client, thereby providing the first client with access to the new temporary file in the new file set; and
    issuing at least one storage command from the first network location directing the remote data storage at the second network location to modify the new temporary file to match at least a portion of the new file creation attributes, wherein the storage command is adapted to direct the remote data storage to rename the new temporary file to a file name specified in the new file creation attributes.

17. The method of claim 16, wherein the first network location includes a first local-area network and the second network location includes a second local-area network, wherein the first local-area network is connected with the second local-area network via a wide-area network.

18. The method of claim 16, wherein the storage command is adapted to direct the remote data storage to move the new temporary file to a file directory specified in the new file creation attributes.

19. The method of claim 16, wherein receiving the new file creation request comprises:
- determining if the new file creation request matches a file rule;
- in response to the determination that the new file creation request does not match the file rule, forwarding the new file creation request to the remote data storage at the second network location; and
- in response to the new file creation request matching the file rule, preventing the new file creation request from reaching the remote data storage at the second network location.

20. The method of claim 19, wherein the file rule is configured by a user.

21. The method of claim 19, wherein the file rule is adapted to select a file based on at least a portion of a file name.

22. The method of claim 19, wherein the file rule is adapted to select a file based on at least a file type.

23. The method of claim 19, wherein the file rule is adapted to select a file based on at least a file location.

24. The method of claim 19, wherein the file rule is adapted to select a file based on at least an application associated with the new file creation request.

25. The method of claim 19, wherein the file rule is adapted to select a file based on at least the first client associated with the new file creation request.

26. The method of claim 16, wherein caching is performed by a WAN optimization device at the first network location.

27. The method of claim 16, wherein caching is performed by an application executed by the first client.

\* \* \* \* \*